United States Patent [19]

Ligensa et al.

[11] Patent Number: 4,488,451
[45] Date of Patent: Dec. 18, 1984

[54] INTEGRAL HAND KNOB GEAR

[75] Inventors: Karl-Heinz G. Ligensa; Philip Cherdron, both of Battle Creek, Mich.

[73] Assignee: Keiper U.S.A. Inc., Battle Creek, Mich.

[21] Appl. No.: 359,573

[22] Filed: Feb. 18, 1982

[51] Int. Cl.³ .............................................. G05G 1/10
[52] U.S. Cl. .............................. 74/553; 16/DIG. 30; 297/362
[58] Field of Search ................. 74/553, DIG. 40, 545, 74/558.5, 421 R, 431; 16/DIG. 30, 117, 118, DIG. 18; 297/362

[56] References Cited

U.S. PATENT DOCUMENTS 3,754,478  8/1973  Perlino .............................. 74/553 X
4,094,210  6/1978  Wirtz et al. .......................... 74/553

Primary Examiner—James A. Leppink
Assistant Examiner—Frank H. McKenzie, Jr.

[57] ABSTRACT

A remote hand knob gear as first of a train of gears for actuating a taumel hinge eccentric constructed as integral plastic support disc and gear adapted for snap on hand knob.

9 Claims, 5 Drawing Figures

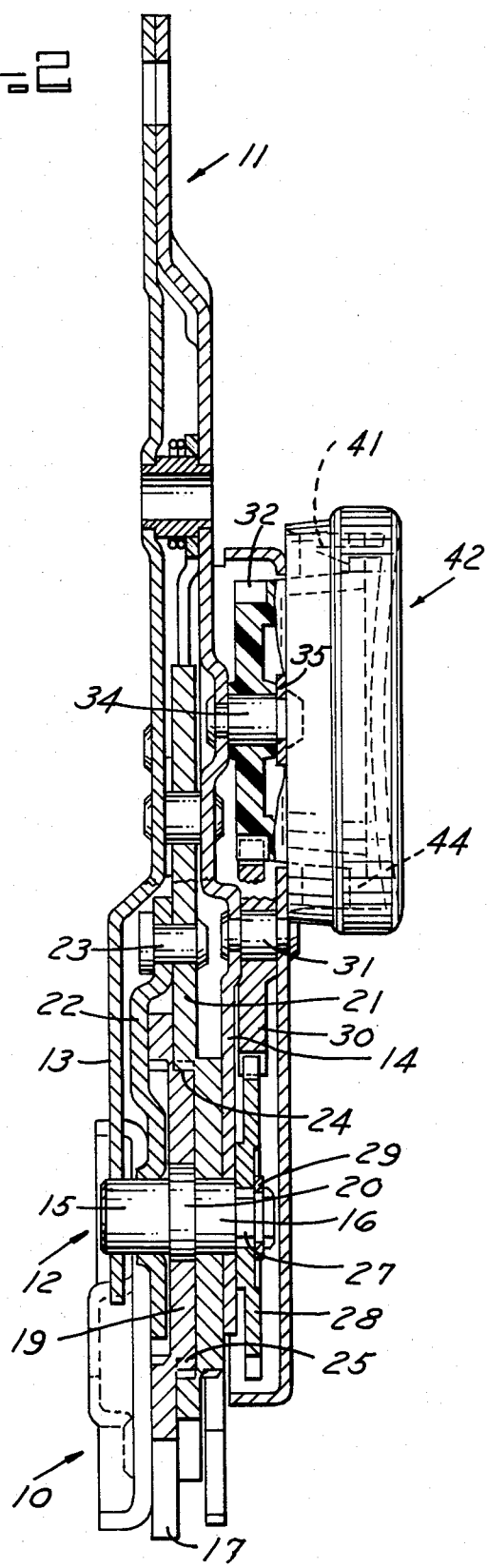

INTEGRAL HAND KNOB GEAR

BACKGROUND OF THE INVENTION

Hand knobs are conventionally attached to manually drive the eccentric of a taumel seat back adjuster with an intermediate support disc such as shown in U.S. Pat. No. 4,094.210 the hand knob is located at the axis of the seat back hinge. In some motor vehicles the hand knob is not conveniently accessable at such position. Such gear train is conventionally made up of a series of spur gears the first of which is actuated by a manual hand knob and the last of which is drivingly connected to a taumel eccentric. Conventionally the spur gears including the first one actuated by the hand knob are constructed as discreet gears with the first one adapted for hand knob actuation through an assembled intermediate support disc similar to that shown in U.S. Pat. No. 4,094,210.

SUMMARY OF THE PRESENT INVENTION

The present invention integrates the support disc and first spur gear into a single plastic configuration adapted for snapon attachment of the hand knob and for convenient rivet bearing attachment to a rigid bracket number for seat back mounting.

BRIEF DESCRIPTION OF THE DRAWINGS

FIG. 2 is a sectional view taken along the line 2—2 of FIG. 1;

FIG. 3 is a sectional view of the integral gear and support disc per se which is shown in assembled relation to FIG. 2;

FIG. 4 is a view taken along the line 4—4 of FIG. 3;

FIG. 5 is a view taken along the line 5—5 of FIG 3.

With reference to FIGS. 1 and 2 the seat hinge includes lower bracket 10 adapted for seat attachment, upper sandwich bracket 11 adapted for seat back attachment, and a pivotal connection provided therebetween by taumel eccentric 12. Bracket 11 has sandwich plates 13 and 14 directly pivoted on co-linear cylindrical surfaces 15 and 16 of eccentric 12 while bracket 10 has plate 17 rigidly attached thereto with rivets 18, plate 17 having formed therein with integral spur gear 19 pivoted on cylindrical surface 20 to provide taumel action upon rotation. Intermediate plate 21 together with backing plate 22 secured thereto by rivets 23 pivot on cylindrical surfaces 15 and 16 of eccentric 12, plate 21 being provided with integral ring gear teeth meshing with teeth of spur gear 19 at 24 when the rise of eccentric surface 20 extends upwardly, as shown, with progressive engagement between spur and ring gear teeth toward engagement at 25 when eccentric surface 20 extends downwardly through 180° rotation of eccentric 12.

Figure 1:
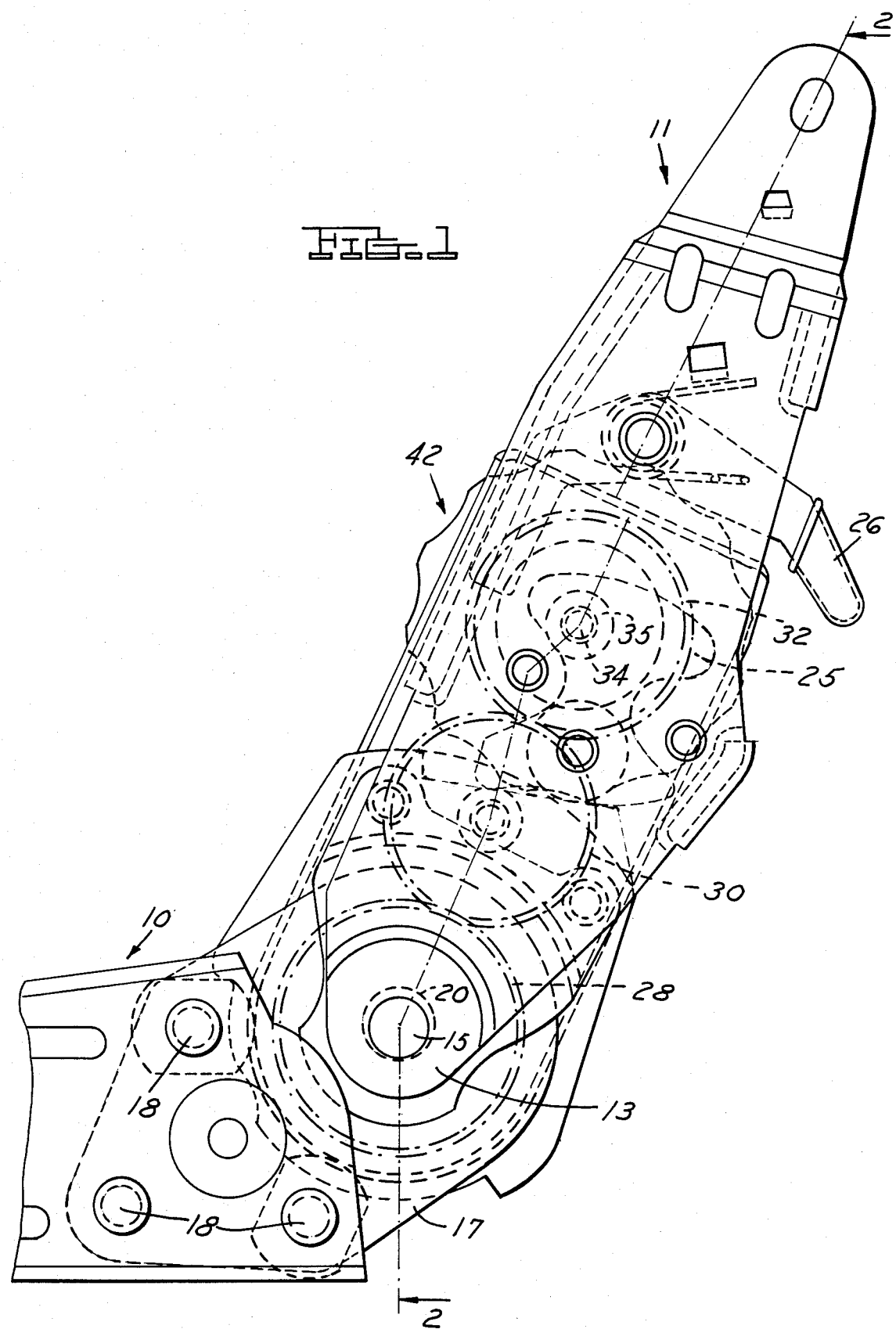
FIG. 1 is a side elevation of a taumel hinge including the integrated support disc and gear of the present invention.

As known in the art, in the case of a two-door vehicle intermediate plate 21 limits the backward movement of seat back bracket 11 to its adjusted operative position via inertia latch 25 which normally permits forward tilting. Inertia latch 25 will arrest forward tilting of bracket 11 relative to intermediate plate 21 upon sudden deceleration of the vehicle as is known in the art, manual release lever 26 being provided to release inertia latch 25 under unusual circumstances as in case of malfunction. In the case of four-door vehicles intermediate plate 21 and inertia latch 25 may be dispensed with and ring gear teeth provided in, or on an element directly connected to, upper bracket 11.

Eccentric 12 is rotated to provide adjustment in the relative position of intermediate plate 21 and lower bracket 10 through taumel action of spur gear 19 within ring gear teeth at 24, 25 by means of flatted extension 27 driven by spur gear 28 retained by lock washer 29, which spur gear is in turn driven by intermediate spur gear 30 pivotally mounted on rivet 31 secured to bracket plate 14, said intermediate gear being in turn driven by spur gear teeth 32 intergrally formed in support disc 33 pivotally mounted on rivet 34 secured to bracket plate 14 and retained in position by snap ring 35. Support disc 33 preferably molded of plastic such as Delrin in addition to having spur gear 32 integrally formed thereon is provided with annular cup 36 extending at 37 to the entire depth of the gear teeth providing rigid annular back-up wall support therefor.

With reference to FIGS. 3, 4 and 5 support disc 33 is provided with annular flange 38 having three lip recesses 39 each provided with lip 40 providing anchors for snap engagement by three resilient fingers 41 of hand knob 42, also preferably formed of plastic, and provided also with three drive recesses 43 engageable by driving lugs 44 integrally formed in the hand knob. With such construction the hinge fitting may be assembled and installed minus the hand knob with any desired cloth or other trim cover for the hinge followed by snapping the hand knob unto the support disc as a last operation.

We claim:

1. Means for driving a train of gears for adjusting a pivoted seat hinge fitting comprising a hinge fitting bracket formed with spaced sandwich plates having inner and outer faces adapted for attachment to a seat back of an automotive vehicle, a hinge pivot an input position for said train of gears remote from the hinge pivot, integral spur gear and hand knob support disc means, and rivet pivot means secured on the outer face of a plate of said hinge fitting bracket for mounting said integral means at said input position, and means on said support disc means for supporting with drive engagement a hand knob applied thereto.

2. The drive means of claim 1 wherein said integral spur gear and hand knob support dsic means is constructed as a plastic molding.

3. The drive means of claim 2 wherein said plastic molding includes an annular back-up wall, and said spur gear includes teeth each having a tooth lateral side integrally supported by said annular back-up wall.

4. The drive means of claim 3 wherein said integral spur gear and hand knob support disc means includes a cup extension on one side of the spur gear.

5. The drive means of claim 4 wherein said cup extension projects from said back-up wall.

6. The drive means of claim 5 wherein said cup extension includes an annular flange projecting outwardly from the end of said cup extension.

7. The drive means of claim 6 wherein said flange includes a plurality of recessed lips for engagement by relilient fingers of a hand knob.

8. The drive means of claim 7 wherein said flange is provided with a plurality of drive recesses intermediate said lip recesses.

9. The drive means of claim 8 wherein said flange is provided with three uniformly spaced lip recesses and three intermediate drive recesses.

* * * * *